United States Patent [19]
Blyler, Jr. et al.

[11] Patent Number: 5,115,487
[45] Date of Patent: May 19, 1992

[54] ALKENE-TREATED SILICONE COMPOUNDS

[75] Inventors: Lee L. Blyler, Jr., Basking Ridge; Edwin A. Chandross, Berkeley Heights; Xina S. Quan, Bridgewater, all of N.J.

[73] Assignee: AT&T Bell Laboratories, Murray Hill, N.J.

[21] Appl. No.: 653,461

[22] Filed: Feb. 8, 1991

Related U.S. Application Data

[63] Continuation of Ser. No. 169,265, Mar. 17, 1988, abandoned.

[51] Int. Cl.$^5$ .................. G02B 6/02; C08F 283/12
[52] U.S. Cl. ............................... 385/128; 428/375; 428/391; 428/392; 428/373; 525/478; 525/479
[58] Field of Search ............. 428/391, 392, 373, 375; 350/96.30, 96.34; 525/479, 478

[56] References Cited

U.S. PATENT DOCUMENTS

| | | | |
|---|---|---|---|
| 4,032,499 | 6/1977 | Kreuzer | 525/479 |
| 4,608,306 | 8/1986 | Vincent | 428/391 |
| 4,665,148 | 5/1987 | Wong | 525/478 |
| 4,689,248 | 8/1987 | Traver | 350/96.3 |
| 4,719,274 | 1/1988 | Wong | 525/478 |

FOREIGN PATENT DOCUMENTS 594250  3/1960  Canada ........................ 525/479

OTHER PUBLICATIONS

"Nylon Jacketed Optical Fibre with Silicone Buffer Layer", *Electronics Letters*, 13, 153 (1977) by T. Naruse, et al.
F. Nakane, et al. *CEIDP Proceedings*, Claymont, Delaware, Oct. 1984.
S. R. Barnes, et al. *IEE Colloquium*, London, Jun., 1984.
R. N. Meals in *Proceedings of the IUPAC Symposium on Silicon Chemistry*, Prague, Czechoslovakia, 1965, Butterworths (London), 1966, pp. 141-158.

*Primary Examiner*—George F. Lesmes
*Assistant Examiner*—J. M. Gray
*Attorney, Agent, or Firm*—B. S. Scheider

[57] ABSTRACT

Siloxane compounds formed by the reaction of a hydridosiloxane with vinylsiloxane are employed in a wide variety of uses, e.g., coatings for optical fibers and flexible layers for touch screen cathode ray tubes. These siloxane materials are substantially improved through treatment with a lower alkene such as ethylene to prevent hydrogen evolution and undesirable crosslinking.

6 Claims, 4 Drawing Sheets

ALKENE-TREATED SILICONE COMPOUNDS

This application is a continuation of application Ser. No. 07/169,265, filed on Mar. 17, 1988, now abandoned.

TECHNICAL FIELD

This invention relates to organic polymers, and in particular, to organic polymers containing silicon.

BACKGROUND OF THE INVENTION

Siloxane polymers have been employed for a wide variety of uses. For example, as disclosed in "Nylon Jacketed Optical Fibre with Silicone Buffer Layer", *Electronics Letters*, 13, 153 (1977) by T. Naruse et al, siloxanes have been used for coating optical fibers. These coatings seem advantageous because of their low modulus of elasticity, e.g., 0.2 to 2 megapascal, their low glass transition temperature (lower than −50 degrees Centigrade), and because they undergo rapid thermal cure from a liquid of appropriate viscosity.

The relatively low modulus attainable with siloxane compounds has led to their use in many other applications. Exemplary of these applications are touch screen cathode ray tube (CRT) assemblies such as those employed for interactive programming. In use, a menu is displayed on the CRT screen and the operator chooses from the menu by touching the screen at an appropriate point. Siloxane bodies are employed as a deformable, interactive member. Light from the CRT entering this member is reflected within the plane of this member at a deformed site, e.g., a site being touched, and sensors at the periphery of the deformable region detect this reflected light. Thus, the interaction is sensed.

Although appropriate siloxane polymers have been successfully used, they have a tendency to become less flexible as they age. Obviously, in applications such as a touch screen CRT this decrease in flexibility is not entirely desirable. Additionally, siloxane polymers evolve hydrogen that adversely affects optical fiber performance. (F. Nakane et al, *CEIDP Proceedings*, Claymont, Del., October 1984 and S. R. Barnes et al., *IEE Colloquium*, London, June 1984.)

SUMMARY OF THE INVENTION

It has been found that not only loss of flexibility, but additionally, evolution of hydrogen occurs upon aging in a significant class of siloxanes appropriate for touch screen and optical fiber applications. Both the undesirable effects of hydrogen evolution and crosslinking are eliminated by treating the final siloxane polymer product of this class—a polymer with reactive hydrogens—with an excess of a lower alkene compound such as ethylene. The alkene reacts with Si—H bonds through an addition reaction to produce Si—alkyl bonds. This alkyl moiety is relatively stable and does not induce hydrogen evolution or further crosslinking. Thus, both hydrogen evolution and further crosslinking are prevented.

Typical of siloxanes which are advantageously treated are those formed by reaction involving vinyl resins such as those represented by the formula

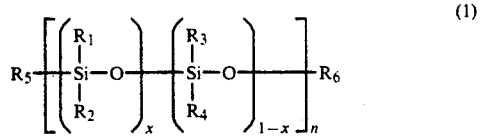

where $R_1$, $R_2$, $R_3$, $R_4$, $R_5$, and $R_6$ are selected from a wide range of moieties including lower alkyl, substituted lower alkyl, cycloalkyl (such as cyclohexyl and cyclopentyl), phenyl, substituted phenyl, phenylalkyl or substituted phenylalkyl, and where at least two groups per molecule from the substituents $R_3$, $R_4$, $R_5$, or $R_6$ are chosen to be vinyl. Cyclic siloxanes are also useful and are represented by formula (1) where $R_5$ and $R_6$ are not employed and where the terminal oxygen is bound to the terminal silicon. (The brackets indicate relative proportions of groups and do not preclude the polymer from being a block copolymer, random copolymer, or a combination of these polymers.)

The vinyl resin is reacted with an excess of a hydridosiloxane which is typically a compound such as that represented by either (a)

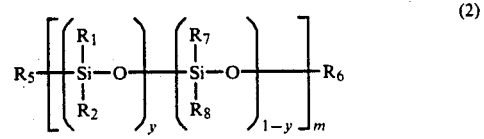

where $R_1$, $R_2$, $R_5$, and $R_6$ are as previously defined but are not vinyl, $R_7$ is hydrogen or dialkylhydrosiloxy, and $R_8$ is lower alkyl, substituted lower alkyl or dialkylhydrosiloxy, or (b)

where $R_9$, $R_{10}$, and $R_{11}$ are chosen to be hydrogen or dialkylhydrosiloxy, and $R_{12}$ is chosen to be hydrogen, dialkylhydrosiloxy, substituted dialkylhydrosiloxy, lower alkyl or substituted lower alkyl such that there are at least two, and preferably three or more, Si—H groups per molecule and no more than one hydrogen bonded to any one Si atom. (As with the compounds of formula (1), those of formula (2) should also be interpreted to include cyclic structures.) This reaction is performed generally in the presence of a catalyst such as chloroplatinic acid to yield compounds that are chemical combinations of the vinyl resin and the hydridosiloxane compound where bonds are formed between the vinyl groups of the vinyl resin and the reactive hydrogens of the hydridosiloxane. (See R. N. Meals in *Proceedings of the IUPAC Symposium on Silicon Chemistry*, Prague, Czechoslovakia, 1965, Butterworths (London), 1966, pages 141-158 for a description of this reaction.)

To promote an efficient reaction, an excess of one of the reactants is employed. Generally, an excess of hydridosiloxane rather than an excess of vinyl resin is employed to avoid unacceptable crosslinking on aging leading to a concomitant increase in the modulus of elasticity. Due to this initial excess, the resulting siloxane compounds have residual reactive hydrogens. Over time during use or storage, these residual moieties tend to react, yielding both crosslinking and release of hydrogen which have significant consequences. The crosslinking leads to an undesirable increase in the modulus of elasticity. In applications such as coatings for optical fibers, the hydrogen through various mechanisms degrades optical fiber properties and thus limits the operating lifetime of the fiber.

DETAILED DESCRIPTION

Figure 1:
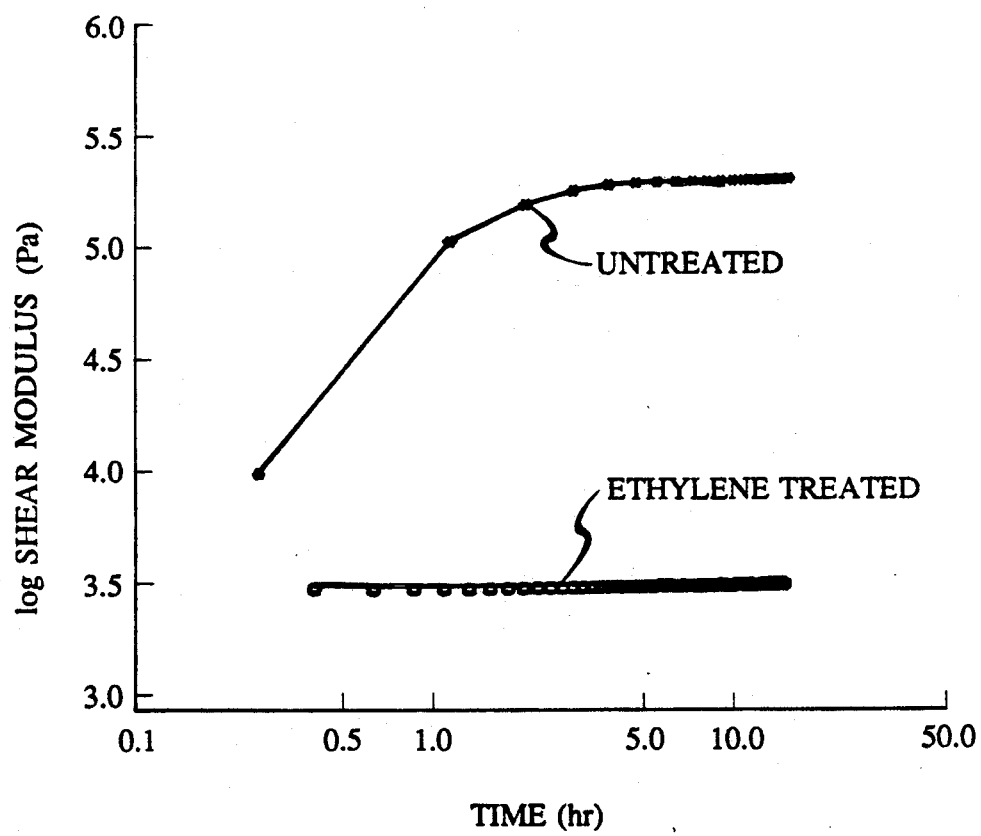
FIGS. 1-4 are illustrative of properties achievable with the invention.

As discussed, the invention prevents both the evolution of significant amounts of hydrogen and the increase in the modulus of elasticity due to undesirable crosslinking in siloxanes having reactive hydrogens. Exemplary of siloxanes with residual reactive hydrogens are those formed by the reaction of compounds of formula (1) with compounds of formula (2) and/or (3) where the second reactant (compounds (2) and/or (3)) is present in excess. An excess of the second reactant is generally employed to yield an adequate reaction rate without inducing extremely accelerated aging. This excess leads to polymers having residual reactive hydrogens which lead upon aging both to hydrogen evolution and to excessive crosslinking.

The elimination of reactive hydrogen atoms in siloxanes is expeditiously and essentially completely accomplished by reaction of the siloxane with an alkene, e.g., lower alkene, such as ethylene that is preferably employed in the gaseous state if polymer swelling is to be preferably employed in the gaseous state if polymer swelling is to be avoided. This reaction produces siloxane compounds with the hydrogens of Si—H moieties replaced by alkyls. Thus, the reactive Si—H groups that lead to hydrogen evolution and excessive crosslinking are eliminated.

Reaction with alkenes such as lower alkenes (e.g., alkenes having less than 6 carbon atoms), is easily achieved by introducing the cured polymer, e.g., the cured coated fiber or the cured material to be utilized in the touch screen CRT assembly, into an environment containing the alkene, and for safety considerations, preferably containing little or no oxygen or other oxidants. The reaction is promoted by a residual catalyst present in the siloxane body. However, even in the absence of this catalyst, high temperatures, e.g., up to approximately 150 degrees Centigrade, also promote the desired reaction. For example, coated optical fiber or the touch screen assembly with its cured siloxane is introduced into an environment containing ethylene. The alkene rapidly diffuses into the siloxane material, and thus reacts with essentially all the reactive Si—H moieties. Unreacted alkene easily diffuses out of the product. In this manner, reactive Si—H moieties are eliminated. A variety of alkenes, such as heteroatom alkenes, undergo the desired reaction with Si—H groups and are not precluded. However, use of an alkene that undergoes subsequent further chemical processes, such as polymerization and dehydrohalogenation, is generally not desirable.

Generally, environments containing a partial pressure of alkenes of approximately one atmosphere are conveniently employed. Lower pressures and higher pressures are not precluded but lead, respectively, to an increase in required production time and increased capital cost for equipment. Typical treatment times at room temperature are in the range of 15 minutes to 48 hours for thickness up to 12 mm. (Larger thicknesses require the longer times within this range.) For treatment of optical fibers, it is desirable to perform the treatment before final spooling. Treatment times of at least 30 seconds are employed for fiber coatings 0.2 mm thick with less time required for thinner coatings. The presence of an additional coating such as a urethane coating over the siloxane on a touch screen assembly requires increased treatment times relative to those adequate in the absence of such additional coatings. Although treatment at room temperature is advantageous, it is possible to perform the treatment at elevated temperatures, e.g., up to 150 degrees Centigrade.

The following examples are illustrative of conditions useful in the invention and the results obtained.

EXAMPLE 1

A two-part reaction mixture designated XCF3-9610 was obtained from the Dow Corning Corporation. This two-component mixture included a first component which was a vinylsiloxane resin and a second component that was a mixture of a copolymer of dimethylsiloxane and hydromethylsiloxane with a vinylsiloxane resin. The first component had approximately 0.13 millimoles of vinyl groups per gram of material and the second component had 0.11 millimoles of reactive vinyl groups on the vinylsiloxane per gram of mixture and 0.51 millimoles of reactive hydrogens on the copolymer per gram of mixture.

Five grams of the first component was mixed in a beaker with 5 grams of the second component. The reaction mixture was allowed to stand for approximately 24 hours, after which the resulting product was a gelatinous material. A portion of the material was subjected to $^1$H NMR analysis which indicated 0.11 millimoles of residual reactive hydrogen groups per gram of material. The shear modulus was measured at 147 degrees Centigrade utilizing a Dynamic Mechanical Thermal Analyzer manufactured by Polymer Laboratories, Inc. At intervals the measurement was repeated to determine the effect of this accelerating aging procedure. The results are shown in FIG. 1.

EXAMPLE 2

The procedure of Example 1 was followed except a portion of the resulting gelatinous material was treated with ethylene. This treatment was accomplished by placing the material in a sealable glass vessel and flowing ethylene through the vessel for approximately an hour. The ethylene flow was then terminated, and the sample was kept in the ethylene filled vessel for approximately 16 hours. The results of the modulus measurements corresponding to those made in Example 1 are shown in FIG. 1. The $^1$H NMR spectrum indicated that there were essentially no vinyl groups or Si—H groups present in the ethylene-treated material within the detection sensitivity of the instrument stated by the manufacturer as 0.1 percent ethylbenzene in deuterochloroform.

EXAMPLE 3

Figure 2:
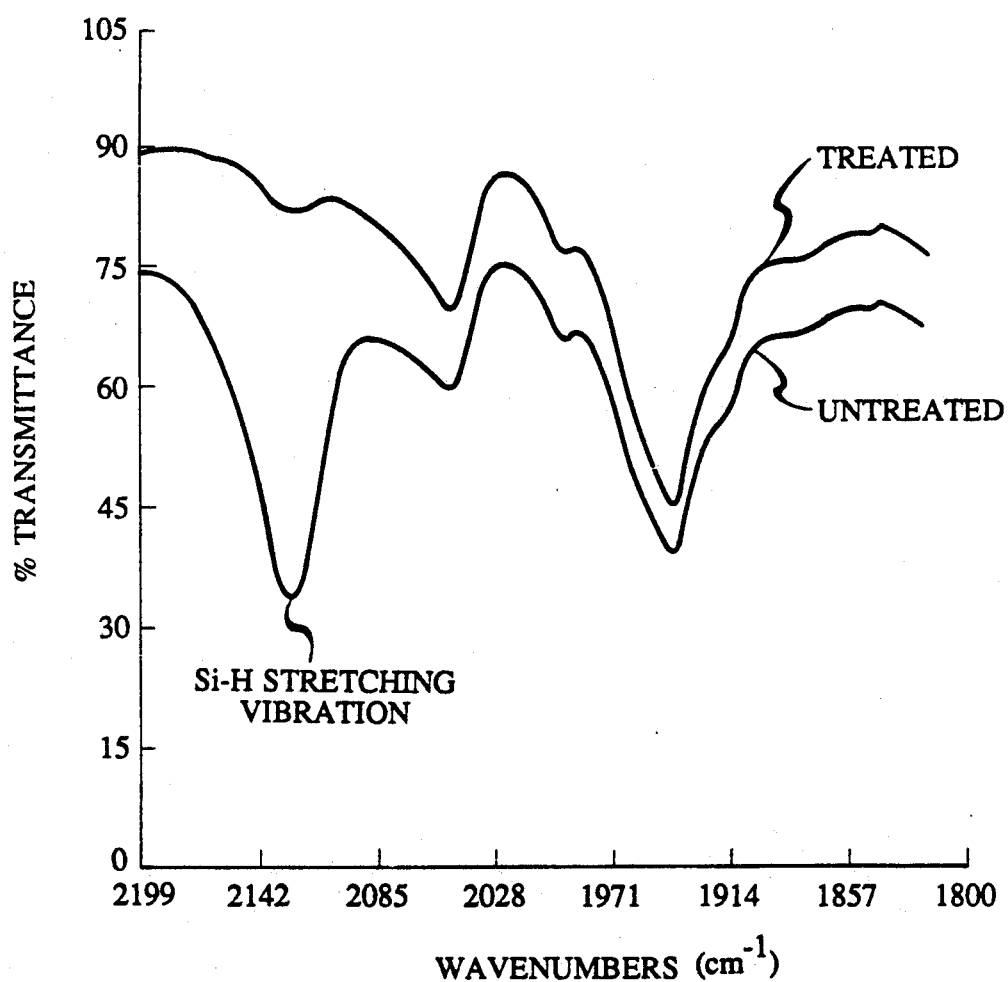

A touch screen assembly was formed by confining the resin described in Example 1 between sealed polyurethane membranes. The assembly was placed in a sealable glass vessel and treated with ethylene as described in Example 2. The IR spectrum through the thickness (approximately 175 mils of siloxane and a total of 20 mils of polyurethane) of the treated touch screen assembly was measured and the results are shown in FIG. 2. A touch screen assembly which had not been treated with ethylene was also measured and this result is also shown in FIG. 2.

EXAMPLE 4

Figure 3:
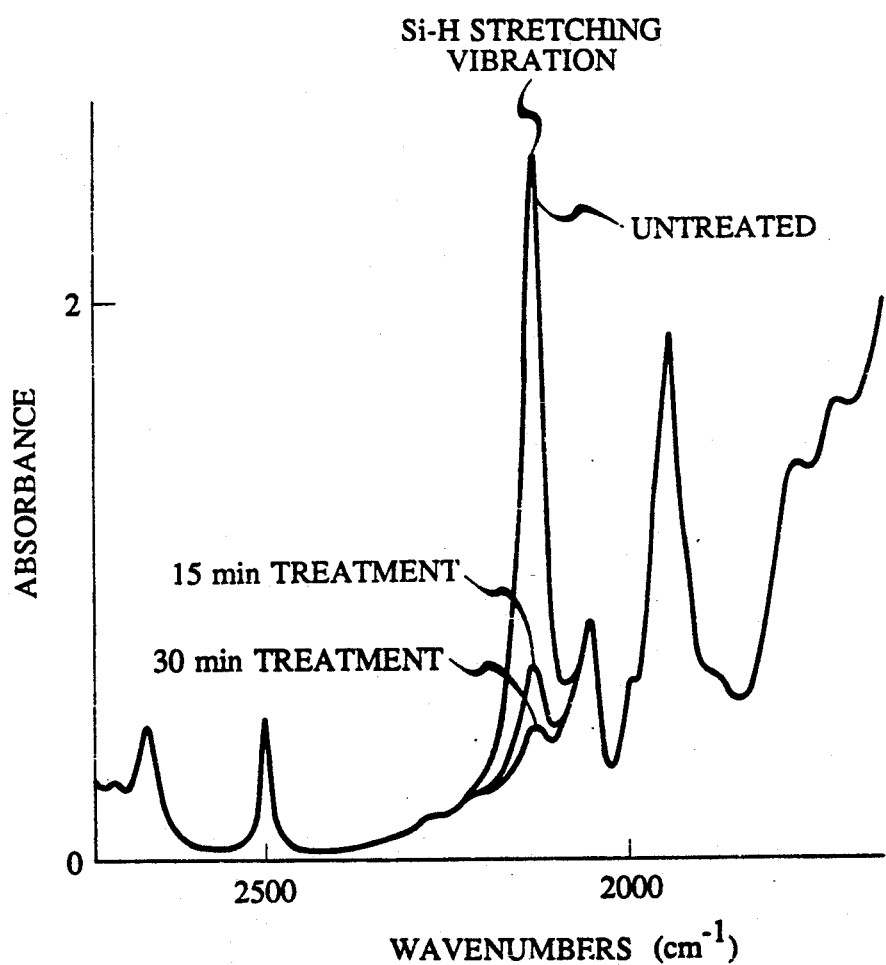

The resin components of Example 1 were mixed as described in Example 1. A drop of the uncured material was deposited on a 23 mil thick silicon wafer measuring approximately 1½ inches by 1½ inches. The silicon wafer was placed into an oven that had been heated to 150 degrees Centigrade. After 3 minutes the sample was removed from the oven. The sample (total thickness of 56 mils) was examined by a Fourier transform infrared spectrum analyzer. The results are shown in FIG. 3. The sample was then treated in flowing ethylene in a sealable glass vessel for 15 minutes. The IR spectrum was again taken and is shown in FIG. 3. The ethylene treatment was then repeated. The results of the total 30 minute treatment are shown in FIG. 3.

EXAMPLE 5

The same procedure as described in Example 4 was followed except that the wafer was removed from the oven and immediately treated for 3 minutes in flowing ethylene. The infrared spectrum indicated that this sample had approximately 56 percent of its reactive hydrogens eliminated. A corresponding sample that was first allowed to cool to ambient temperature before ethylene treatment had approximately 40 percent of the reactive hydrogens eliminated.

EXAMPLE 6

Figure 4:
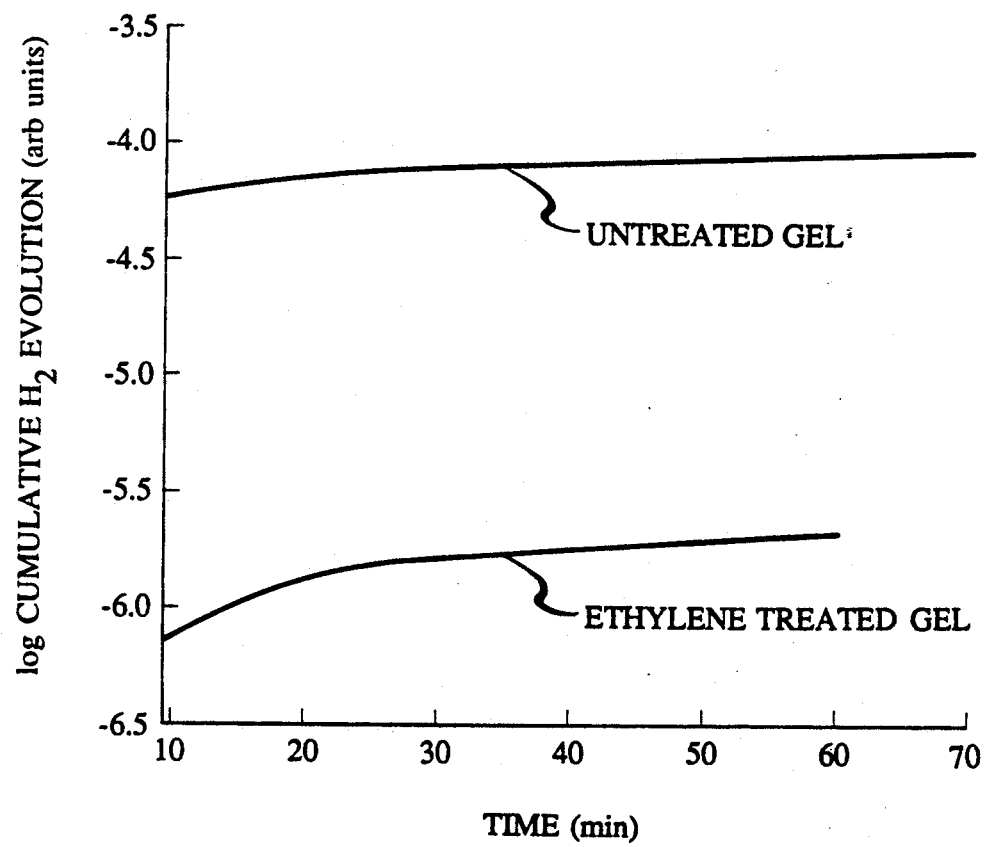

Approximately 0.5 gram of the resin directly after mixing as described in Example 1 was placed in a quartz tube (approximately 5 millimeters inside diameter) sealed at one end. The resin was allowed to cure for three days. The tube was connected to a UTi Precision Gas Analyzer (Model 100C). The gel was heated by sliding the tube into a furnace that had been preheated to 200 degrees Centigrade and the evolved gas was collected over sequential 10 minute periods and analyzed for hydrogen by mass spectrometry. The results are shown in FIG. 4.

The same procedure was followed except the sample was treated with ethylene for 48 hours by placing the tube in a sealable glass vessel filled with ethylene. The results are also shown in FIG. 4.

What is claimed is:

1. The article formed by the process of treating a body with an alkene wherein said body comprises a siloxane polymer 1) that has reactive hydrogen atoms bound to silicon atoms and 2) that has been sufficiently cured to be gelatinous whereby said alkene chemically reacts with said hydrogen atoms.

2. The article of claim 1 wherein said alkene comprises a lower alkene.

3. The article of claim 2 wherein said alkene comprises ethylene.

4. The article of claim 3 wherein said body comprises an optical fiber coated with said siloxane.

5. The article of claim 3 wherein said body comprises a touch screen assembly.

6. The article of claim 2 wherein said siloxane is the reaction product of a hydridosiloxane and a vinyl resin wherein said vinyl resin comprises a material represented by the formula

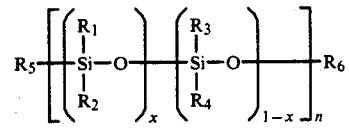

where $R_1$, $R_2$, $R_3$, $R_4$, $R_5$, and $R_6$ are selected from the group consisting of lower alkyl, substituted lower alkyl, cycloalkyl, phenyl, substituted phenylalkyl, and phenylalkyl, but where at least two groups per molecule are chosen from the substituents $R_3$, $R_4$, $R_5$, and $R_6$ to be vinyl.

* * * * *